United States Patent [19]
Moon

[11] Patent Number: 6,000,598
[45] Date of Patent: Dec. 14, 1999

[54] METHOD FOR CORRECTING THE DIRECTION OF WEAVING OF A WELDING TORCH WITH RESPECT TO A WELDING CENTERLINE

[75] Inventor: Sueng-bin Moon, Suwon, Rep. of Korea

[73] Assignee: Samsung Electronics Co., Ltd., Rep. of Korea

[21] Appl. No.: 08/960,062

[22] Filed: Oct. 29, 1997

[30] Foreign Application Priority Data

Nov. 13, 1996 [KR] Rep. of Korea ............... 96-53812

[51] Int. Cl.⁶ .................... B23K 9/12; B23K 31/12
[52] U.S. Cl. ........................ 228/103; 219/125.12
[58] Field of Search .................. 228/27, 29, 103; 219/124.22, 124.33, 125.12

[56] References Cited

U.S. PATENT DOCUMENTS

| | | | |
|---|---|---|---|
| 4,412,121 | 10/1983 | Kremers et al. | 219/124.34 |
| 4,561,738 | 12/1985 | Estes. | |
| 4,590,577 | 5/1986 | Nio et al. | 395/87 |
| 4,849,679 | 7/1989 | Taft et al. . | |
| 5,063,281 | 11/1991 | Mizuno et al. | 219/125.12 |
| 5,510,595 | 4/1996 | Gainand | 219/124.34 |
| 5,582,750 | 12/1996 | Hamura et al. | 219/124.34 |
| 5,780,808 | 7/1998 | Moon | 219/124.34 |

*Primary Examiner*—Patrick Ryan
*Assistant Examiner*—Carlos J. Gamino
*Attorney, Agent, or Firm*—Burns, Doane, Swecker & Mathis LLP

[57] ABSTRACT

A method for correcting the welding path of a welding torch which weaves from side to side while proceeding along the welding path is disclosed. The method comprises the steps of: determining the center of weaving of the welding torch with respect to a welding center line, by monitoring the arc current which varies according to the change of distance between the welding end of the welding torch and a welding surface; and correcting the center of weaving of the welding torch to a correction position on the welding center line, when the center of weaving of the welding torch is misaligned with the welding center line by a predetermined distance, in which the direction of weaving of the welding torch is corrected to be perpendicular to an imaginary line connecting the most recent two correction positions among the correction positions of the center of weaving.

5 Claims, 7 Drawing Sheets

METHOD FOR CORRECTING THE DIRECTION OF WEAVING OF A WELDING TORCH WITH RESPECT TO A WELDING CENTERLINE

BACKGROUND OF THE INVENTION

1. Field of the Invention

The present invention relates to a method for correcting the welding path of a welding torch in automatic welding.

2. Description of the Related Art

As shown in FIG. 1, an automatic welding apparatus which automatically welds two base metals includes a welding torch 10 supported by a torch holder 2 coupled to an arm 1 of a welding robot (not shown), and a controller 3 for controlling the welding robot. In a welding process, the welding torch 10 moves integrally with the arm 1 of the welding robot which, operates based on signals from the controller 3. A high voltage is applied between the welding torch 10 and base metals 20 and 30 being welded, in order to generate an arc therebetween. A welding wire 5 is provided from a wire reel 4 to the welding torch 10, and projects appropriately from the welding end of the welding torch 10. The end of the wire 5 projecting from the welding end of the welding torch 10 is melted by the arc current, and then hardens on welding surfaces 21 and 31 of the respective base metals 20 and 30, to combine the base metals 20 and 30.

During the above welding process, arc sensing is performed to confirm whether the welding torch 10 moves precisely tracing a welding center line, i.e., a boundary line between the two base metals 20 and 30, based on data of arc current values. The data is obtained by weaving the welding torch 10, that is, moving the welding torch 10 from side to side as it proceeds along the weld, and monitoring the arc current using a current monitor 6 according to the change of distance between the welding torch 10 and the welding surfaces 21 and 31.

The principle of the arc sensing is detailed with reference to the drawings. As shown in FIGS. 2 and 3, when the first base metal 20 and the second base metal 30 contacting each other are automatically welded, the welding torch 10 proceeds along the welding center line in a previously taught direction as indicated by an arrow "A" and concurrently performs weaving the same distance to the left and right as shown in dashed lines, in order to weld the two base metals 20 and 30. In the middle of the weaving, the welding torch 10 reciprocates between the farthest points from the center of weaving "C" toward and above the respective first and second base metals, i.e., a first position and a second position. In the case that the welding torch 10 precisely traces the welding center line 25, the center of weaving "C" is located perpendicularly above the welding center line 25. Also in this case, a vertical distance "H1" between the welding end of the welding torch 10 and the first base metal 20 at the first position is the same as a vertical distance "H1'" between the welding end of the welding torch 10 and the second base metal 30 at the second position. A vertical distance "H" is the maximum distance between the welding end of the welding torch 10 and the welding center line 25, at the position where the welding torch 10 is coincident with the welding center line 25.

FIG. 4 is a graph showing the change of vertical distance between the welding end of the welding torch 10 and the welding surfaces 21 and 31 of the first and second base metals 20 and 30, as the welding torch 10 weaves from the first position to the second position. Here, the horizontal and vertical axes "t" and "d" represent time and vertical distance, respectively. Referring to FIG. 4, it is indicated that the welding torch 10 disposed at the first position is moved to the second position over a predetermined time "t1" while performing weaving. Here, the vertical distance between the welding end of the welding torch 10 and the welding surface 21 of the first base metal 20 increases until the welding torch 10 reaches the center of weaving "C", i.e., time "t1/2". While the welding torch 10 moves to the second position after having passed the center of weaving "C", the vertical distance between the welding end of the welding torch 10 and the welding surface 31 of the second base metal 30 decreases.

Meanwhile, the arc current decreases as the distance between the welding end of the welding torch 10 and the welding surfaces 21 and 31 of the base metals 20 and 30 increases. Accordingly, the arc current varies as shown in FIG. 5 while the welding torch 10 moves from the first position to the second position. The current monitor 6 monitors the arc current varying as above and transfers information on the variation to the controller 3. The controller 3 calculates the integral of the current during the movement from the first position to the center of weaving "C", and the integral of the current during the movement from the center of weaving "C" to the second position, and compares these two integral values. When the two integral values are the same, the center of weaving "C" of the welding torch 10 is determined to coincide with the welding center line 25, that is, the welding torch 10 exactly traces the welding center line 25.

However, as shown in FIG. 6, when the weaving center "C" of the welding torch 10 is misaligned with the welding center line 25, a vertical distance H2, between the welding end of the welding torch 10 and the first base metal 20 at the first position, and a vertical distance H4, between the welding end of the welding torch 10 and the second base metal 30 at the second position, are different from each other. When the welding torch 10 is located at the center of weaving "C", the welding torch 10 is located above the second base metal 30. Here, the vertical distance between the welding end of the welding torch 10 and the second base metal 30 is indicated by "H3". During the movement of the welding torch 10 between the first position and the second position, the vertical distance between the welding end of the welding torch 10 and the welding surfaces 21 and 31 of the first and second base metals 20 and 30 varies as shown in FIG. 7. Accordingly, the arc current varies as shown in FIG. 8. Thus, the integral of the current between the first position and the center of weaving "C", and that of the current between the center of weaving "C" and the second position, are different from each other. Thus, the controller 3 determines that the welding torch 10 does not precisely trace the welding center line 25. When the difference between the integral values exceeds a predetermined value, signals are generated from the controller 3. Then, the robot arm 1 moves according to the signals, in a direction that can minimize the difference between the integral values, so that the position of the center of weaving "C" is corrected to be positioned perpendicularly above the welding center line 25.

As shown in FIG. 9, when welding is performed in a state in which a proceeding direction "A" taught to the welding torch and the welding center line 25 are not coincident, the position of the weaving center is continuously corrected as explained above. That is, when the welding torch moves such that the center of weaving thereof follows the direction indicated by the arrow "A" and reaches a position "A1", at which the distance between the welding torch and the welding center line 25 becomes greater than a predetermined value, the above-mentioned correction of the weaving center is performed such that the center of weaving is located at a first correction position "B1" on the welding center line 25. Thereafter, the welding torch further proceeds following the direction "A", and corrections of the weaving center are made again at positions "A2" and "A3", at which the distance from the welding center line 25 becomes greater than the predetermined value, to second and third correction positions "B2" and "B3". Such corrections of the weaving center, i.e., correction of a welding path, are continuously performed during welding.

However, according to the conventional method for correcting a welding path, the weaving of the welding torch is always in a direction "W1" perpendicular to the direction "A" in which the welding torch proceeds. When the welding torch weaves in the direction "W1" and when the welding center line 25 is skewed with respect to the direction "A" of the welding torch as shown in FIG. 9, the distance of weaving perpendicular to the welding center line 25, i.e, the distance between the first position and the second position, decreases. Thus, the integral of the current during the movement between the first position and the weaving center, and the integral of the current during the movement between the weaving center and the second position, are reduced, and thus the difference between the two integral values decreases. Therefore, since the correction of the welding path of the welding torch is not performed at the instant the correction should be performed, the precision of the welding process is lowered.

SUMMARY OF THE INVENTION

To solve the above problem, it is an objective of the present invention to provide a method for correcting a welding path of a welding torch which enables precise correction of the center of weaving of the welding torch when the direction that the welding torch proceeds and a welding center line are un-matched.

Accordingly, to achieve the above objective, there is provided a method for correcting the welding path of a welding torch which weaves from side to side while proceeding along the welding path, which comprises the steps of: determining the center of weaving of the welding torch with respect to a welding center line, by monitoring the arc current which varies according to the change of distance between the welding end of the welding torch and a welding surface; and correcting the center of weaving of the welding torch to a correction position on the welding center line, when the center of weaving of the welding torch is misaligned with the welding center line by a predetermined distance, in which the direction of weaving of the welding torch is corrected to be perpendicular to an imaginary line connecting the most recent two correction positions among the correction positions of the center of weaving.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
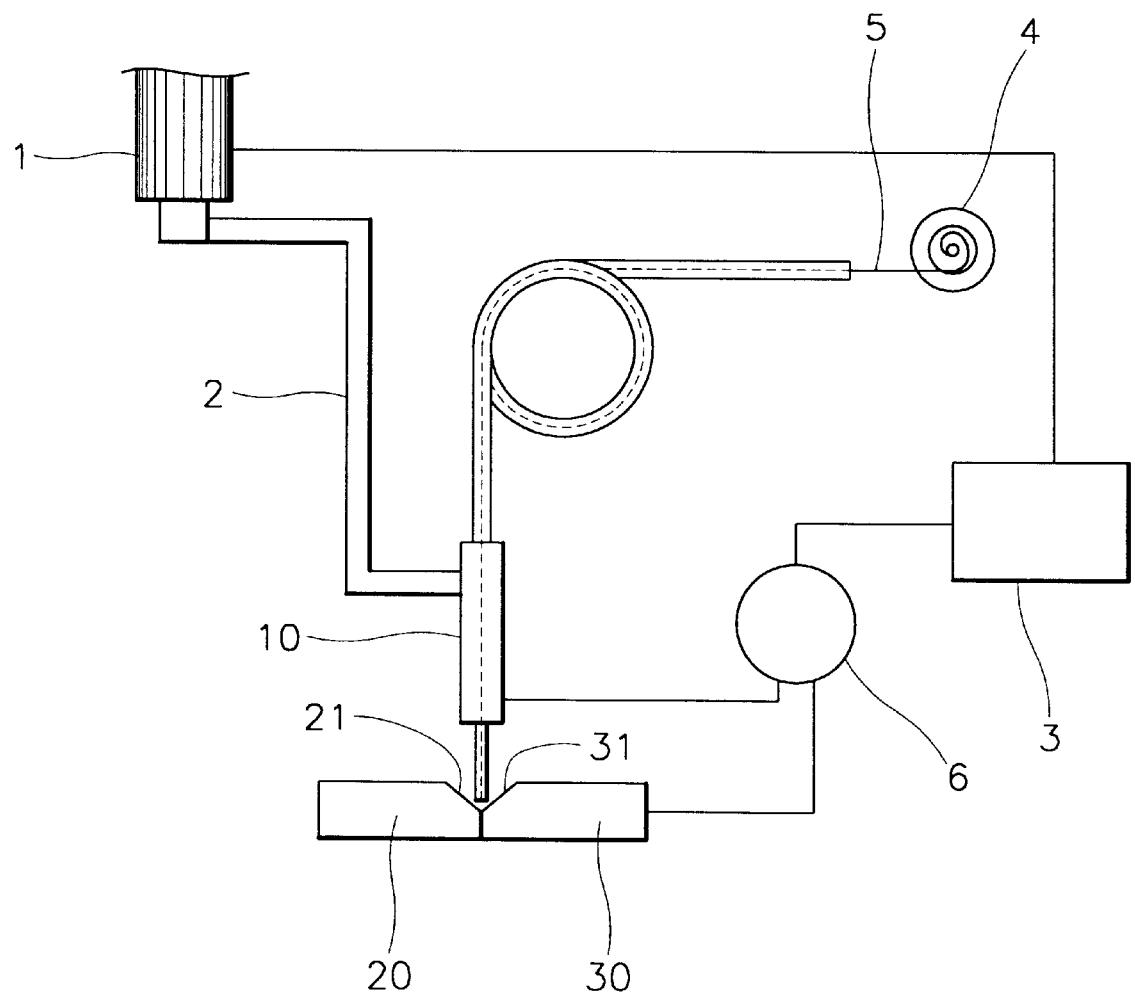
FIG. 1 shows the structure of an example of an automatic welding apparatus.
Figure 2:
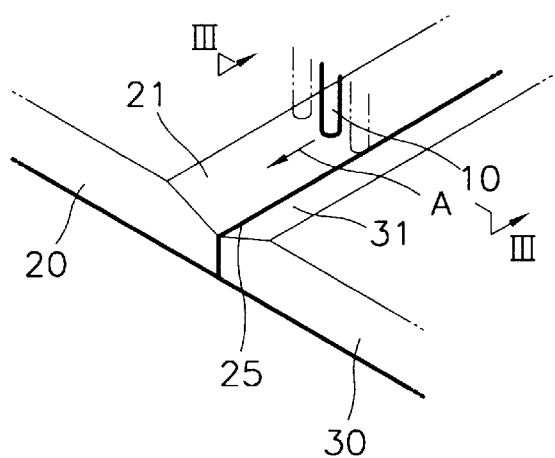
FIG. 2 is a perspective view illustrating the welding torch and the base metals shown in FIG. 1.
Figure 3:
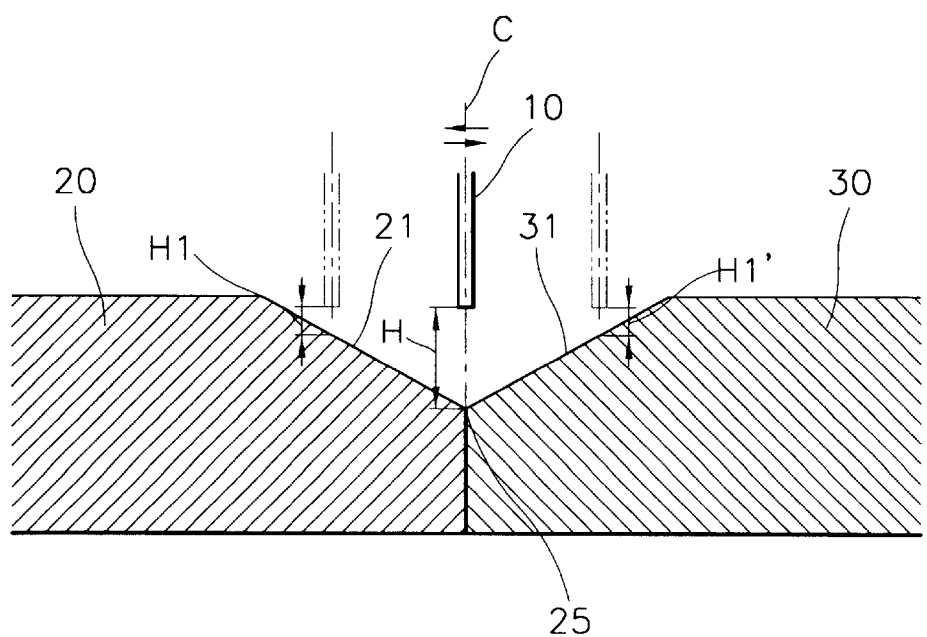
FIG. 3 is a sectional view taken along line III—III of FIG. 2.
Figure 4:
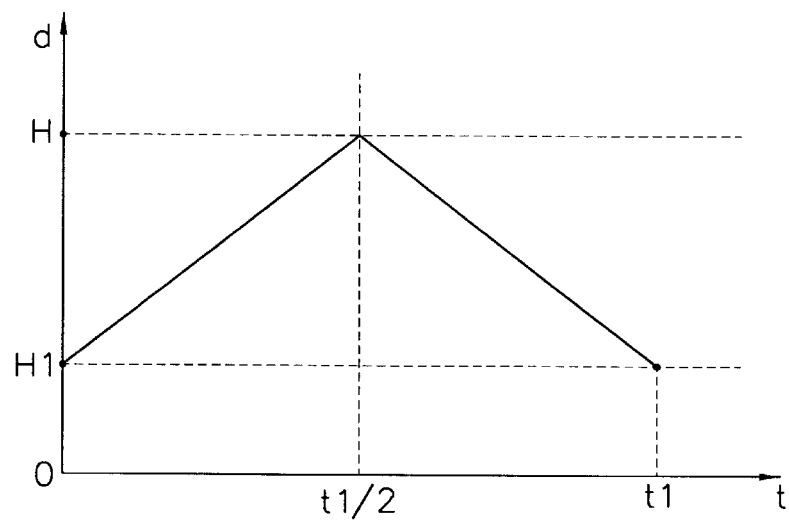
FIG. 4 is a graph of vertical distance between the welding end of the welding torch and the base metals shown in FIG. 3 versus the time while the welding torch moves from the first position to the second position.
Figure 5:
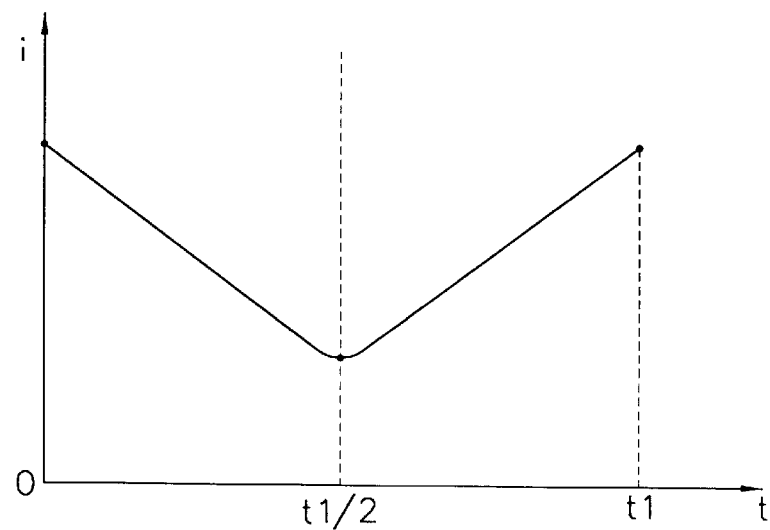
FIG. 5 is a graph of arc current versus time while the welding torch moves from the first position to the second position.
Figure 6:
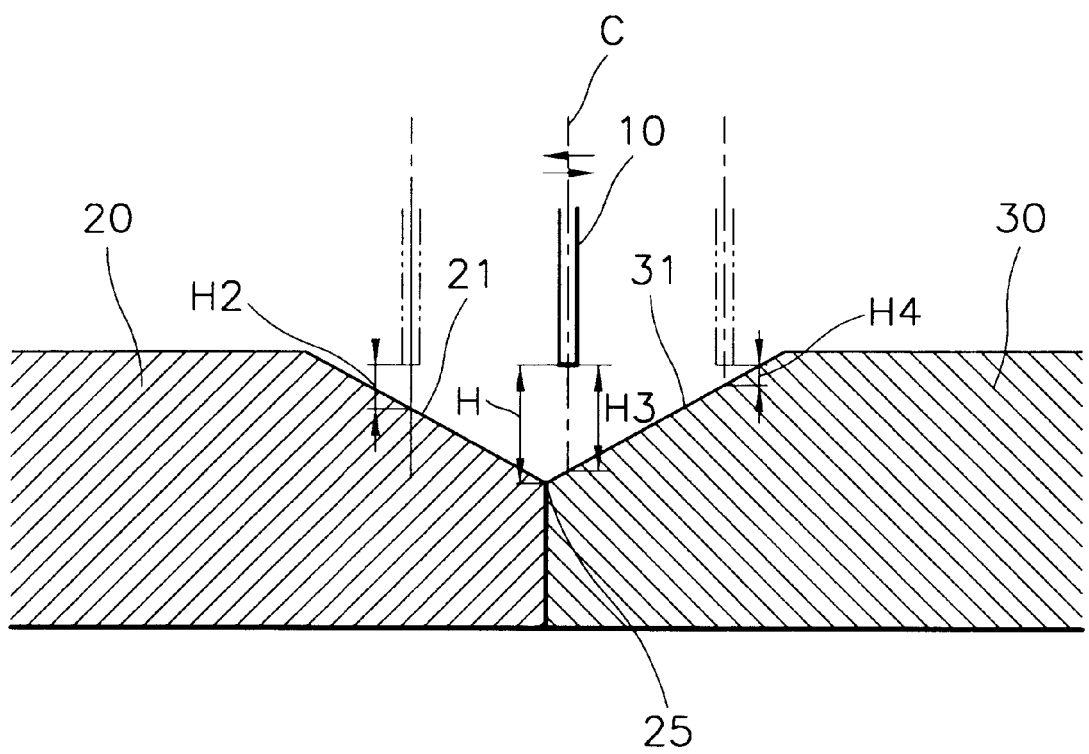
FIG. 6 is a sectional view illustrating the welding torch and the base metals in the case in which the center of weaving of the welding torch is misaligned with the welding center line.
Figure 7:
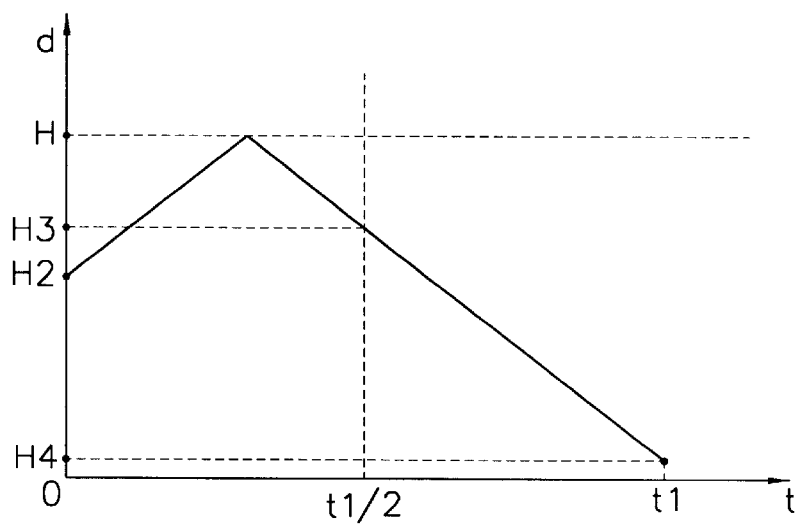
FIG. 7 is a graph of vertical distance between the welding end of the welding torch and the base metals shown in FIG. 6 versus time while the welding torch moves from the first position to the second position.
Figure 8:
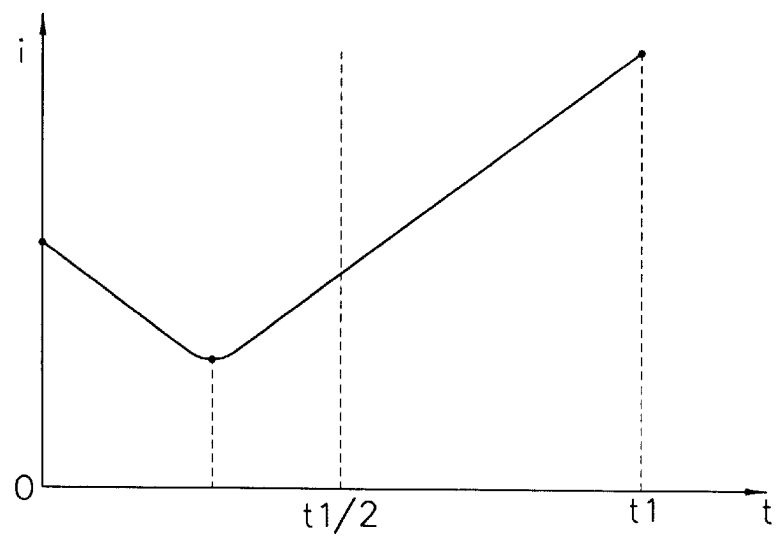
FIG. 8 is a graph of arc current value versus time while the welding torch moves from the first position to the second position.
Figure 9:
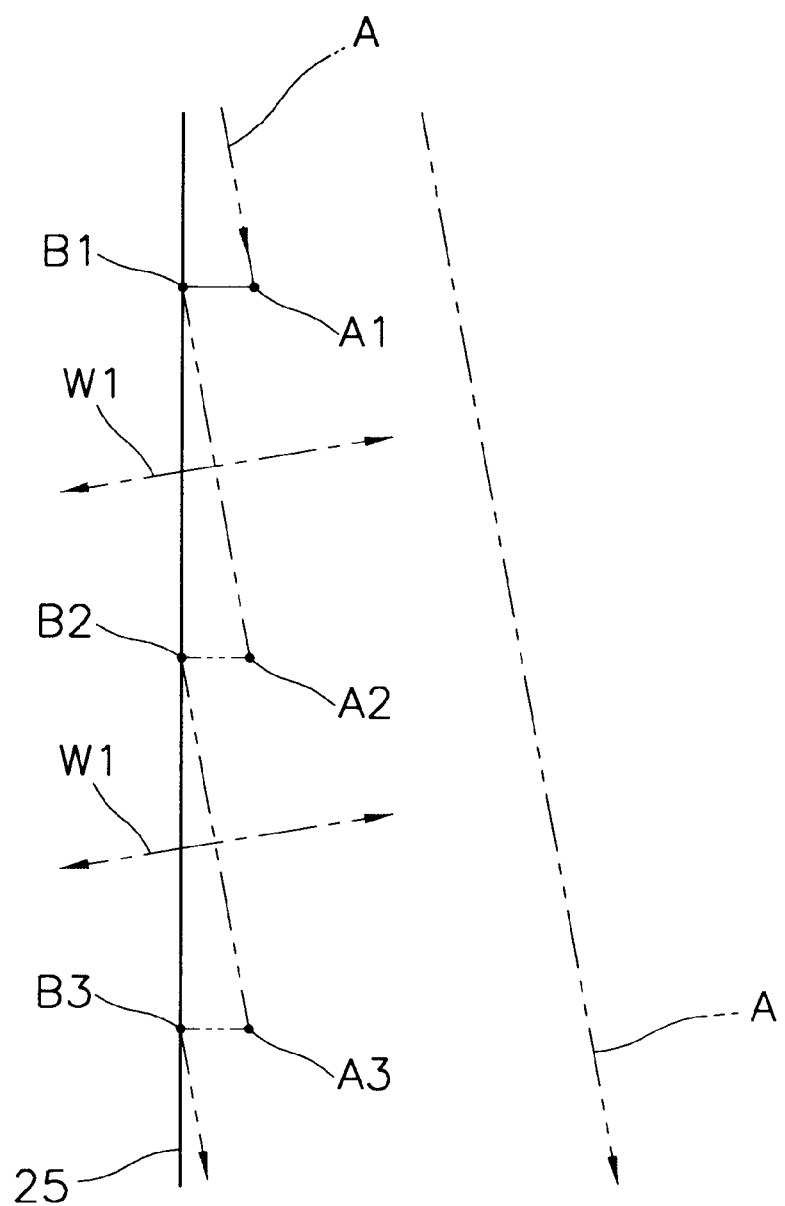
FIG. 9 is a diagram showing the path of the center of weaving of the welding torch during automatic welding, according to the conventional method for correcting a welding path.
Figure 10:
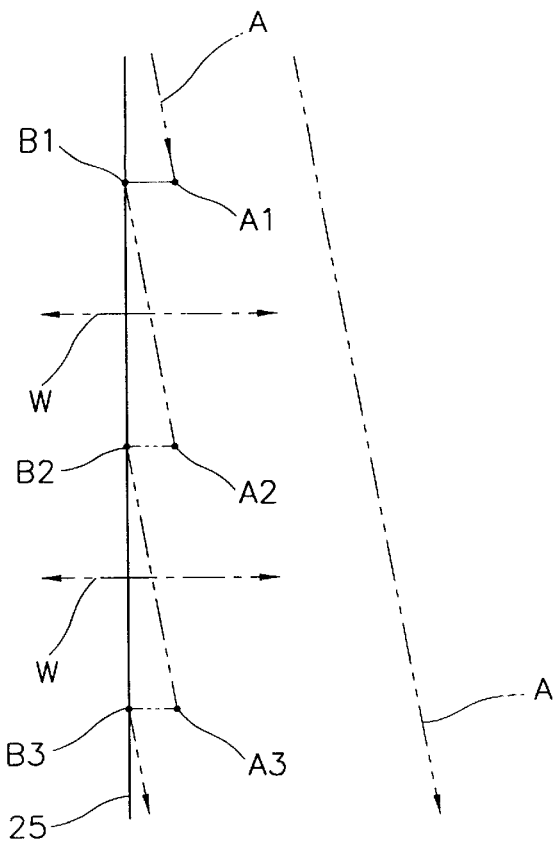
FIG. 10 is a diagram showing the path of the center of weaving of the welding torch during automatic welding, according to a method for correcting a welding path according to the present invention.

A method for correcting a welding path of a welding torch according to the present invention includes an arc sensing step and a correction of the center of weaving as described above with reference to FIGS. 1 through 8. Like the conventional method explained referring to FIG. 9, the correction of the center of weaving is continuously performed as described above, as welding is performed in a state in which the direction "A" in which the welding torch proceeds and the welding center line 25 make a predetermined angle. That is, as shown in FIG. 10, in the above state, when the welding torch reaches a position "A1", at which the distance between the center of weaving of the welding torch and the welding center line 25 is greater than a predetermined value, the correction of the center of weaving is performed so that the center of weaving is located at the first correction position "B1" on the welding center line 25. Then, as the welding torch continuously performs weaving while proceeding in the direction "A", the distance between the center of weaving and the welding center line 25 increases and again becomes greater than the predetermined value. That is, when the welding torch reaches positions "A2" and "A3", the welding position is again corrected to the second and third correction positions "B2" and "B3". Such correction of the welding path is made continuously as long as the welding is performed.

Figure 11:
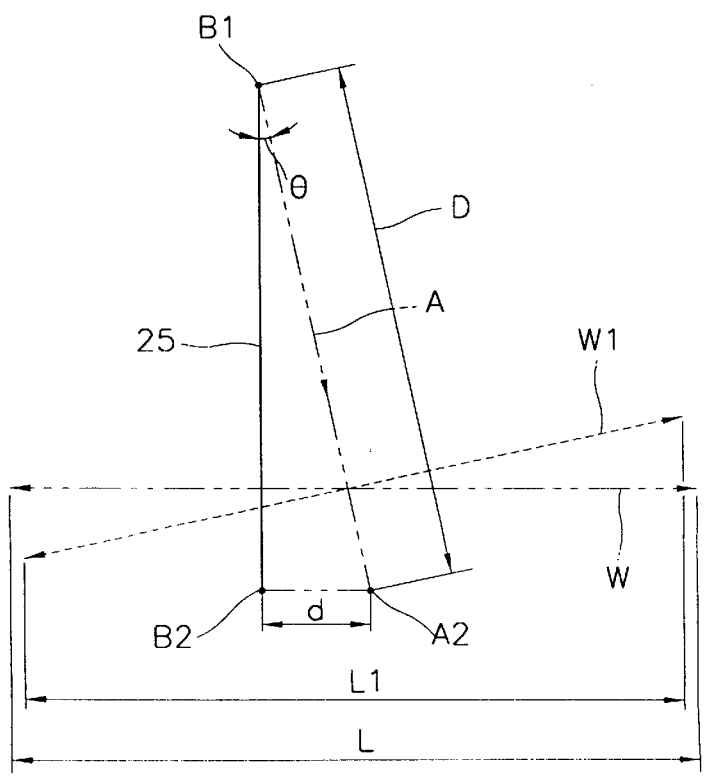
FIG. 11 is an enlargement of a portion of the path of the center of weaving shown in FIG. 10.

According to the present invention, the direction of weaving of the welding torch can be corrected based on data about the most recent two correction positions in correcting the center of weaving as described above. For instance, when the center of weaving is corrected to the second correction position "B2", an imaginary line is drawn by the controller 3 between two correction positions B1 and B2. The imaginary line is congruous with the welding center line 25 in FIG. 10, and it is determined whether the direction of weaving of the welding torch is perpendicular to the imaginary line. If the direction of weaving of the welding torch is not perpendicular to the imaginary line, the controller 3 generates a signal for rotating the arm 1 of the robot such that the direction of weaving of the welding torch is perpendicular to the imaginary line. For instance, when the weaving of the welding torch is performed in a direction perpendicular to the direction "A" that the welding torch proceeds as indicated by a dotted line "W1" as shown in FIG. 11, the welding torch is rotated by an angle θ made by the direction "A" that the welding torch proceeds and the welding center line 25. The degree θ can be obtained from the below equation.

$$\theta = \cos^{-1}(d/D)$$

In the above equation, "D" denotes the distance that the welding torch proceeds, and "d" denotes the distance between the center of weaving of the welding torch and the welding center line 25, just before the correction to the second correction position "B2".

Thus, the welding torch weaves in a direction "W" perpendicular to the imaginary line which connects the second correction position "B2" and the first correction position "B1", and moves again in the taught direction "A". After the center of weaving is corrected to a third correction position "B3", it is again determined as described above whether the direction of weaving of the welding torch is perpendicular to the imaginary line connecting the most recent two correction positions, i.e., an imaginary line connecting the third correction position "B3" and the second correction position "B2". However, as shown in FIG. 10, since the imaginary line connecting the first correction position "B1" and the imaginary line connecting the second correction position "B2", and the second correction position "B2" and the third correction position "B3" are coincident with the welding center line 25, the direction "W" of the weaving is consequently perpendicular to the imaginary line connecting the second correction position "B2" and the third correction position "B3". Thus, the signal for rotating the arm 1 of the robot is not generated from the controller 3 and the welding torch proceeds in the taught direction "A" without change of the direction of weaving. During welding, it is determined at each correction position whether the direction of weaving needs to be corrected, and correction is made, if necessary.

Therefore, when the welding torch weaves in a direction perpendicular to the imaginary line connecting the most recent two correction positions, the problem in the conventional method, described with reference to FIG. 9, can be resolved.

That is, in the conventional method, the weaving direction of the welding torch "W1" (see FIG. 11) is always perpendicular to the direction "A" that the welding torch proceeds, and thus the weaving distance "L1" perpendicular to the welding center line 25 is shortened, so that the difference between the current integrals for calculating the distance between the center of weaving and the welding center line 25 is reduced. However, according to the method of the present invention, since the direction of weaving "W" is corrected to be perpendicular to the welding center line 25, the weaving distance "L" perpendicular to the welding center line 25 is not reduced, so that the difference between the current integrals does not decrease. Thus, since the correction of the center of weaving is made accurately at the correct time, the precision of the welding is improved.

As described above, in the present invention comprising a step of correcting the direction of weaving of the welding torch, when the welding center line is skewed by a predetermined angle with respect to the direction that the welding torch proceeds, in a process of correcting the welding path of the welding torch, the position of the center of weaving of the welding torch can be more accurately corrected at a desired place.

What is claimed is:

1. A method for correcting a welding path of a welding torch which weaves from side to side while proceeding along the welding path, said method comprising the steps of:

determining the center of weaving of the welding torch with respect to a welding center line, by monitoring the arc current which varies according to a change of distance between the welding end of the welding torch and a welding surface;

correcting the center of weaving of the welding torch to a correction position on the welding center line, when the amount of misalignment between the center of weaving of the welding torch and the welding center line is greater than a predetermined value; and correcting the direction of weaving of the welding torch to be perpendicular to an imaginary line connecting most recent two correction positions among the correction positions of said center of weaving.

2. The method for correcting a welding path of a welding torch of claim 1, wherein the welding torch weaves while proceeding along the welding path such that said welding torch weaves a substantially same distance in a left direction and a right direction.

3. The method for correcting a welding path of a welding torch of claim 1, wherein the imaginary line connecting the most recent two correction positions is congruous with the welding center line.

4. The method for correcting a welding path of a welding torch of claim 1, wherein the direction of weaving of the welding torch is defined by a line along which the welding torch moves across the welding center line when the welding torch is moving in a direction along the welding center line.

5. The method for correcting a welding path of a welding torch of claim 1, wherein the direction of weaving is corrected to be substantially perpendicular to the welding center line.

* * * * *